UNITED STATES PATENT OFFICE.

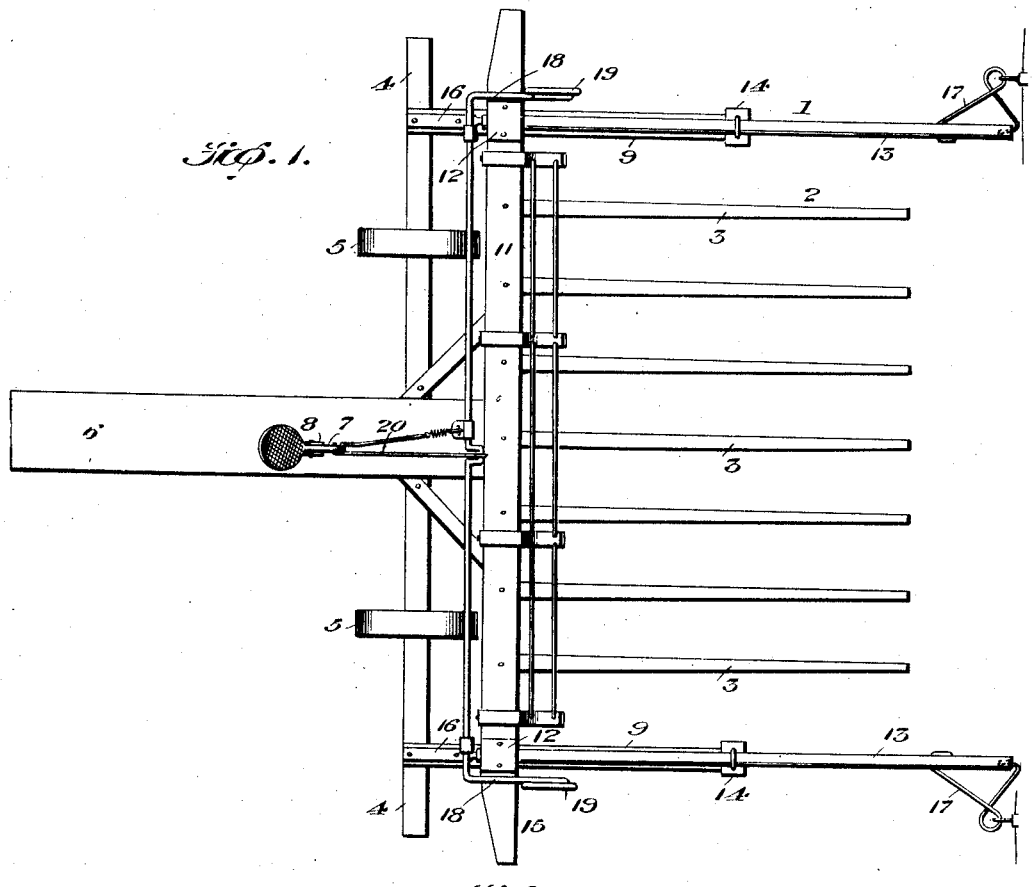
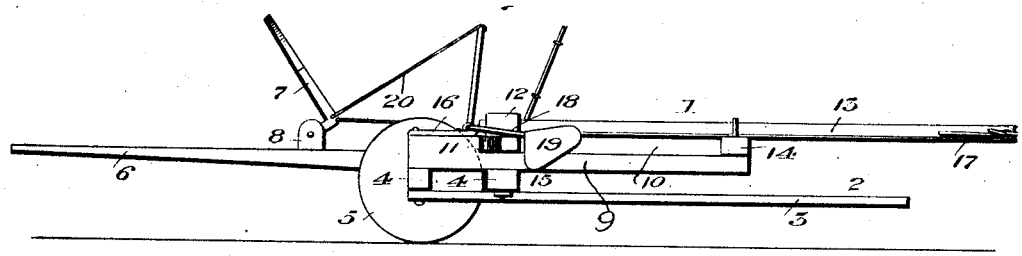
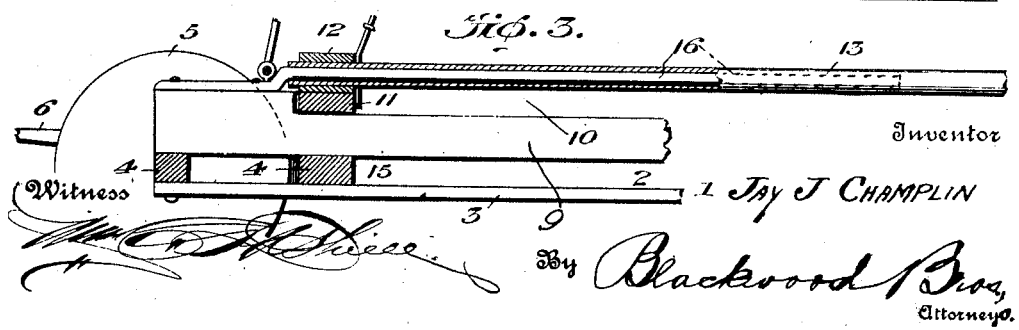

JAY JEROME CHAMPLIN, OF LAUREL, NEBRASKA.

HAY-SWEEP.

1,344,863.

Specification of Letters Patent.   Patented June 29, 1920.

Application filed February 7, 1920. Serial No. 357,094.

*To all whom it may concern:*

Be it known that I, JAY J. CHAMPLIN, a citizen of the United States, residing at Laurel, in the county of Cedar, State of Nebraska, have invented certain new and useful Improvements in Hay-Sweeps; and I do declare the following to be a full, clear, and exact description of the invention, such as will enable others skilled in the art to which it pertains to make and use the same.

My invention relates to improvements in hay sweeps.

In localities where it is customary to harvest hay in large quantities it is generally stored in stacks by suitable stacking machines that are supplied with loads of the hay for elevation into position on the stack by an implement commonly known as a "sweep" that is drawn or pushed over a field where hay has been cut and cured, in order to gather a load, that is transferred to the receiving tines of a stacker.

An ordinary sweep in depositing a load of gathered hay onto the stacker is liable to withdraw and carry away part of the load of hay when it is removed from the stacker and the object of the invention is to provide a sweep which will effect a proper deposit of a load of hay from the sweep onto the stacker without the dislodgment of any portion of the load upon the withdrawal of the sweep from the stacker.

A further object is to provide a sweep wherein when the team is moved forward to discharge a load the sweep will be drawn over the teeth to impart the initial movement to the load, and wherein the moment the team is backed the sweep will be moved rearwardly and restored to its normal position in close proximity to the rake head.

A further object is to provide means for preventing the teeth of both the sweep and stacker from being twisted or bent out of shape in which event they will not properly mesh or go between the teeth of the stacker.

A further object is to provide a platform so constructed and situated that the operator by changing his position forward or backward thereon is enabled to adjust the forward end of the tines or teeth of the sweep with relation to the surface or ground and thereby greatly assist in the operation of the sweep.

A still further object is to provide a hay sweep which is simple, inexpensive and durable in construction, very effective in use, easy to operate and not liable to derangement.

The invention consists in the several features and in the construction, combination and arrangement of such features as more fully hereinafter are described and claimed.

Referring to the drawings:

Figure 1 is a top plan view.

Fig. 2 is a side view.

Fig. 3 is a detail view of one side of the sweep partly in section.

In the drawings in which similar reference characters denote similar parts throughout the several views, 1 represents the hay gathering sweep, 2 a fork having tapering tines, 3, secured at tne rear to the underside of cross beams 4, one of said cross beams being provided with wheels 5 by which the device is adapted to be moved and guided over the ground.

A suitable platform 6 extends rearwardly from the upper surface of the rear cross beam 4 and has mounted thereon an operating lever 7 pivoted in a bearing 8. At each side of the sweep a forwardly extending side bar 9 is provided which is bolted, or otherwise secured, to the upper surface of the cross beams 4 and has a reduced portion or recess 10.

A slidable sweep bar 11 is mounted in the recess 10 and is provided with lugs 12 in each of which the inner end of a longitudinal sleeve 13 is mounted, such sleeves slidable in bearings 14 projecting upwardly from the side bars 9, and a hay pusher frame 15 is mounted on and extends upwardly and downwardly from the sweep bar 11.

Longitudinal rods 16 are securely bolted to the rear portions of the side bars 9 and extend and telescope into the sleeves 13, carrying the sweep bar, and the sleeves 13 are longitudinally slidable on the side bars.

The end of each sleeve is provided with a bracket 17 adapted to receive a suitable swingle tree, double tree or other draft device for the attachment of a team of draft animals by which the hay pusher frame is moved forward and in doing so discharges the load of hay onto the stacker.

In order to retain the slidable sweep bar 11 in its normal position, abutting against the rear end of the recess 10, a transversely extending locking lever 18 is provided mounted in bearings on the side bars and platform and each end having a weighted clutch hook 19 adapted to automatically engage the opposite ends of the slidable sweeper bar 11 and securely lock the same in its rearmost position against the rear end of recess 10, and 20 is a link which operatively connects the operating lever 7 with the locking lever 18.

The locking lever 18 will automatically and securely engage and hold the slidable sweep bar 11 in position at the rear of the sweep until the operating lever is operated to release it from the clutch hooks of the locking lever, after which the sweep bar is moved forward and pushes the hay on to the stacker. The operation is as follows:

The slidable sweep is loaded with hay and moved forward, by horse power attached to the sleeves 13, in front of or facing the head of a suitable stacker and partially engages the same, the slidable sweep bar is released from the clutch hooks by the operating lever and moves forward and forces the hay off the sweep teeth and presses it onto the stacker teeth of the stacker, thus loading the same and then by the backing of the team the slidable sweep bar is returned to its normal position and automatically locked by the weighted clutch hooks.

Some of the essential difficulties encountered with the ordinary hay sweeps are that by constant use the teeth of both the sweep and stacker become twisted and are bent out of shape and position in such manner that they do not properly mesh with or go between each other, and as a result in driving in to load the stacker the teeth of the sweep strike and catch on the timbers at back of the stacker head with great force and damage the horses drawing the same, and strain the machinery, and when the sweep is withdrawn from the stacker the hay clings to the teeth of the sweep and the operation must be repeated several times before the load of hay will remain in its proper place on the stacker, all of which results in a great loss of time and causes considerable expense, and it is my intention to obviate the above faults as far as it is possible.

I do not wish to be understood as limiting myself to the specific details of construction and arrangement as herein described and illustrated, as it is manifest that variations and modifications may be made in the features of construction and arrangement, in the adaption of the device to various conditions of use, without departing from the spirit and scope of my invention and improvements. I therefore reserve the right to all such variations and modifications as properly fall within the scope of my invention and the terms of the following claims.

What I claim is:—

1. In a hay sweep, a slidable sweep bar having telescopic guiding means both members of each telescopic means being mounted on an arm projecting from the sweep and one of said members being slidable.

2. In a hay sweep, a slidable sweep bar having telescopic guiding means and pivoted means for automatically locking said bar in its normal position.

3. In a hay sweep, recessed side arms, a slidable sweep bar, mounted in said recesses, and telescopic guiding means for said slidable sweep bar.

4. In a hay sweep, recessed side arms a slidable sweep bar mounted in said recesses, and telescopic guiding means for said sweep bar, one member of said telescopic means mounted on the side arms and the other member on the slidable sweep bar.

5. In a hay sweep, side arms each having a recess, a slidable sweep bar mounted in said recesses, telescopic guiding means for said sweep bar, one member of said telescopic means mounted on the side arms and the other member on the slidable sweep bar and means for automatically locking said sweep bar in its normal position.

6. In a hay sweep, recessed side arms, provided with rods, a slidable sweep mounted in the said recesses of the side arms, and provided with sleeves in which the said rods are adapted to slide, and means for automatically locking the said slidable sweep in its normal position.

7. In a hay sweep, recessed side arms provided with longitudinal rods, a slidable sweep bar mounted in the recesses of the said side arms, and provided with longitudinal sleeves in which the said rods are mounted and adapted to slide, means for automatically locking the sweep bar in its normal position, hay gathering teeth, and a tiltable platform for regulating the distance between the hay gathering teeth and the ground.

8. In a hay sweep, a slidable sweep bar having telescopic guiding means, hay gathering teeth, automatic means for locking said slidable sweep in its normal position, a tiltable platform for regulating the distance between the hay gathering teeth and the ground.

9. In a hay sweep, a slidable sweep bar having telescopic guiding means, automatic means for locking said slidable sweep bar in its normal position, hay gathering teeth, a rearwardly extending tiltable platform to regulate the distance between the hay gathering teeth and the ground.

10. In a hay sweep, a slidable sweep bar having telescopic guiding means, automatic means for locking said slidable sweep bar in its normal position, means for releasing said bar and a tiltable platform for regulating the distance between the hay gathering teeth and the ground.

In testimony whereof I have affixed my signature.

JAY JEROME CHAMPLIN.